(12) United States Patent
Liu

(10) Patent No.: US 12,535,170 B2
(45) Date of Patent: Jan. 27, 2026

(54) SEALING PIPE JOINT MADE OF RESIN

(71) Applicant: Feature-Tec (Shanghai) New Materials Co., Ltd., Shanghai (CN)

(72) Inventor: Xuegua Liu, Shanghai (CN)

(73) Assignee: Feature-Tec (Shanghai) New Materials Co., Ltd., Shanghai (CN)

( * ) Notice: Subject to any disclaimer, the term of this patent is extended or adjusted under 35 U.S.C. 154(b) by 0 days.

(21) Appl. No.: 18/901,065

(22) Filed: Sep. 30, 2024

(65) Prior Publication Data
US 2025/0320944 A1    Oct. 16, 2025

(30) Foreign Application Priority Data

Apr. 10, 2024 (CN) .......................... 202410426984.3

(51) Int. Cl.
*F16L 47/04* (2006.01)
*F16L 19/028* (2006.01)
*F16L 19/04* (2006.01)

(52) U.S. Cl.
CPC .......... *F16L 47/041* (2019.08); *F16L 19/0283* (2013.01); *F16L 19/041* (2013.01)

(58) Field of Classification Search
CPC ..... F16L 47/041; F16L 33/223; F16L 19/041; F16L 19/0283
See application file for complete search history.

(56) References Cited

U.S. PATENT DOCUMENTS

| 5,743,572 | A | 4/1998 | Nishio | |
| 6,045,164 | A * | 4/2000 | Nishio | F16L 19/041 |
| | | | | 285/423 |
| 10,132,431 | B2 * | 11/2018 | Fujii | F16L 19/028 |
| 2006/0157975 | A1 * | 7/2006 | Fujii | F16L 19/028 |
| | | | | 285/247 |
| 2016/0061361 | A1 * | 3/2016 | Fujii | F16L 33/223 |
| | | | | 285/382.5 |
| 2017/0159854 | A1 * | 6/2017 | Fujii | F16L 19/0212 |
| 2022/0390052 | A1 * | 12/2022 | Koike | F16L 33/226 |

FOREIGN PATENT DOCUMENTS

| CN | 109642694 B | 2/2021 | |
| WO | WO-2016052222 A1 * | 4/2016 | ............ F16L 47/041 |

* cited by examiner

*Primary Examiner* — Matthew Troutman
*Assistant Examiner* — James A Linford

(57) ABSTRACT

A sealing pipe joint made of resin includes a joint body, an inner ring, and a nut. The inner ring includes a plug head, the joint body includes a slot portion, the plug head is inserted within the slot portion to form a sealing connection. The nut is connected to the join body to maintain the plug head and the slot portion in a plugged state, the nut presses against the inner ring. In a free state, a radius thickness of the plug head is linearly changed along the axis of the inner ring, and in plugged state, the slot portion is elastically deformed and a radius changing rate of the slot portion is less than that of the plug head when the plug head is in the free state.

7 Claims, 4 Drawing Sheets

SEALING PIPE JOINT MADE OF RESIN

CROSS-REFERENCE TO RELATED APPLICATIONS

The present disclosure claims the priority of Chinese Invention Application No. CN202410426984.3, filed on Apr. 10, 2024, the entire contents of which are hereby incorporated by reference.

FIELD

The present disclosure relates to the field of pipe joints, and more particularly to a sealing pipe joint that is made of resin.

BACKGROUND

There are known resin pipe joints used in manufacturing equipment in technical fields such as semiconductor manufacturing, medical/pharmaceutical manufacturing, food processing, and the chemical industry. Such resin pipe joints are used to connect pipes for the flow of fluids such as ultrapure water or pharmaceutical fluids to other pipes or fluid devices, and are capable of engaging with the pipes.

U.S. Pat. No. 5,743,572A and Chinese Patent CN109642694B both disclose the structure of such joint, which mainly consists of a joint body, an inner ring and a nut, as shown in FIG. 1. The joint body (a) forms a groove portion (b), the inner ring (c) forms an insertion portion (d), the insertion portion (d) is inserted into the groove portion (b). A width D1 of the groove portion (b) remains unchanged along an insertion direction, a wall thickness T0 of the insertion portion (d) also remains unchanged along the insertion direction, and T0>D1.

When using such joint described above, it is found that this structure has many shortcomings. Firstly, there is a large insertion resistance when the insertion portion is inserted into the groove portion. The inner ring has to overcome a large frictional resistance during the insertion, resulting in the need of a strong pressure for inserting into the insertion portion, which further shortens the service life of such joint and leads to laborious assembly and disassembly of the joint. The relative movement between the insertion portion and the groove portion during the assembly and disassembly process may cause the wear of the insertion portion, and the more the times the insertion portion is inserted and removed, the heavier the wear is. The compression rate of the inner ring in the next assembly is reduced accordingly, and the sealing reliability is thus reduced. Moreover, the large frictional resistance leads to a large tightening torque of the nut, which is laborious to tighten the nut without using tools. Secondly, for the inner ring which has been pressed into the insertion portion by force for many years, when the pipe needs to be removed from the joint, the pipe needs to be pulled hard in the direction away from the joint body, which may easily detach the pipe from the inner ring with the inner ring still being attached to the joint body due to the large frictional resistance. If this happens, since the inner ring is still attached to the joint body, the inner ring has to be removed with pliers or the like when the removed pipe is connected to the joint body again. As a result, the inner ring may be damaged, and the tightness of contact between the inner ring and the pipe may be weakened when the pipe is connected to the joint body again, thereby reducing the sealing between the pipe and the joint body. It is practically impossible to connect the joint body to the pipe again.

SUMMARY

The present disclosure provides a sealing pipe joint made of resin, which includes a joint body that has a slot portion, an inner ring that has a plug head, and a nut. In the present disclosure, firstly, the plug head is provided with an inclination angle θ that is greater than a deformation angle α of the slot portion, which not only ensures the sealing effect of the plug head and the slot portion and makes it easier for the plug head to position into the slot portion for insertion, but also reduces a frictional resistance to be overcome when the plug head is inserted into the slot portion. Since the frictional resistance is gradually increased, the contact surface is less likely to be damaged. Thus, the service life of the joint body and the inner ring can be extended, and the overall frictional resistance during the insertion of the plug head into the slot portion is low, allowing the nut to be tightened with a low torque. Secondly, as a cross-section of the plug head of the inner ring is conical, a front end of the plug head has a largest stroke and a smallest compression, while a rear end of the plug head has a largest compression and a smallest stroke, which results in that the rear end of the plug head which has the largest compression is first detached from the slot portion during the disassembly, thus, the inner ring can be disengaged from the joint body with a relatively small force while maintaining the connection state between the inner ring and the pipe. In this case, the damage to the inner ring during each installation and disassembly is reduced, which therefore improves the service life of the inner ring for multiple installations and disassemblies. Meanwhile, it is relatively labor-saving for each installation and disassembly, allowing the re-connection between the pipe and the pipe joint to be more labor-saving, reliable, and easy. Furthermore, the compression rate of the inner ring is not reduced, the sealing reliability and durability can be ensured after the pipe joint is re-connected to the pipe.

To achieve the above objectives, an embodiment of the present disclosure provides a sealing pipe joint made of resin including a joint body, an inner ring, and a nut. The inner ring includes a plug head, the joint body includes a slot portion, the plug head is inserted within the slot portion to form a sealing connection. The nut is connected to the join body to maintain a plugged state between the plug head and the slot portion, the nut remains pressing against the inner ring. In a free state, a radius thickness of the plug head is linearly changed along an axis of the inner ring, and in the plugged state, the slot portion is elastically deformed and a radius changing rate of the slot portion is less than a radius changing rate of the plug head when the plug head is in the free state.

In another embodiment, in the free state, an inner peripheral surface of the plug head and the axis of the inner ring form an angle θ; in the plugged state, the slot portion is deformed, and an outer peripheral surface of the slot portion and the axis of the inner ring form an angle α; the angle θ is greater than the angle α.

In another embodiment, 0<θ<15°.

In another embodiment, T2>T1>D, D is a width of the slot portion, T1 is a thickness of a front end of the plug head, and T2 is a thickness of a rear end of the plug head.

In another embodiment, in the plugged state, a compression rate of the plug head decreases along the insertion direction, a compression rate of the front end of the plug head is greater than or equal to 0, and a compression rate of the rear end of the plug head is less than or equal to 40%.

In another embodiment, in the free state, an outer peripheral surface of the plug head and the axis of the inner ring form an angle.

In another embodiment, the joint body includes a cylindrical portion, the cylindrical portion includes an outer cylindrical portion and an inner cylindrical portion formed on one side thereof, extending outwardly in an axial direction of the cylindrical portion, the outer cylindrical portion has an extension length greater than that of the inner cylindrical portion, the slot portion is surrounded by the cylindrical portion, the outer cylindrical portion and the inner cylindrical portion.

In another embodiment, the sealing pipe joint made of resin further includes a pipe. The inner ring is inserted into the pipe, the inner ring is provided with a protrusion protruding radially outward, and the protrusion enlarges the inlet portion of the pipe to form a sealing connection.

In another embodiment, the pipe extends between the joint body and the inner ring, the nut is mounted on the pipe and screwed to the joint body, the nut and protrusion of the inner ring clamp the pipe tightly so as to form a sealing connection.

In another embodiment, the joint body and the inner ring are respectively made of a resin material.

Compared with the existing pipe joint, the present disclosure has beneficial effects as follows.

Firstly, the plug head is provided with an inclination angle θ that is greater than the deformation angle α of the slot portion, which not only ensures the sealing effect of the plug head and the slot portion and makes it easier for the plug head to position into the slot portion for insertion, but also reduces the frictional resistance to be overcome when the plug head is inserted into the slot portion. Since the frictional resistance is gradually increased, the contact surface is less likely to be damaged. Thus, the service life of the joint body and the inner ring can be extended, and the overall frictional resistance during the insertion of the plug head into the slot portion is low, allowing the nut to be tightened with a low torque.

Secondly, as the cross-section of the plug head of the inner ring is conical, the front end of the plug head has the largest stroke and the smallest compression, while the rear end of the plug head has the largest compression and the smallest stroke, which results in that the rear end of the plug head which has the largest compression is first detached from the slot portion during the disassembly, thus, the inner ring can be disengaged from the joint body with a relatively small force while maintaining the connection state between the inner ring and the pipe. In this case, the damage to the inner ring during each installation and disassembly is reduced, which therefore improves the service life of the inner ring for multiple installations and disassemblies. Meanwhile, it is relatively labor-saving for each installation and disassembly, allowing the re-connection between the pipe and the pipe joint to be more labor-saving, reliable, and easy. Furthermore, since the wear of the inner ring and the joint body can be avoided and the compression rate of the inner ring is not reduced, the sealing reliability and durability can be ensured after the pipe joint is re-connected to the pipe.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

Figure 1:
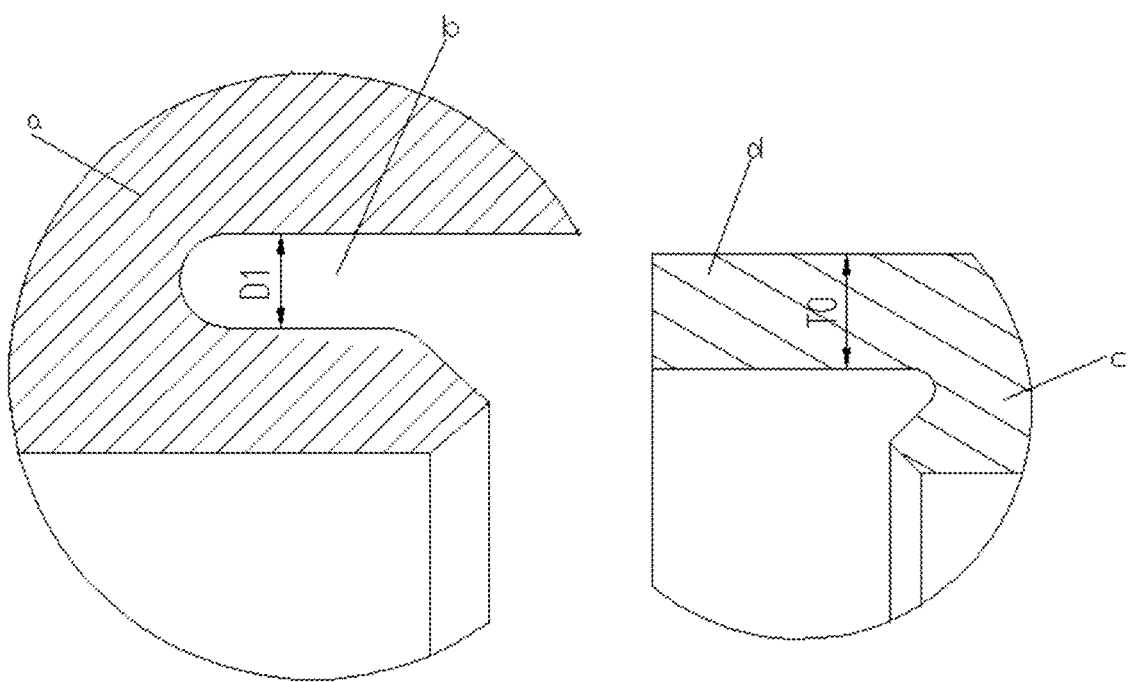
FIG. 1 is a structural schematic view of a plug head and a slot portion of the prior art.

DESCRIPTION OF REFERENCE NUMERALS 1, joint body
2, inner ring
3, nut
4, pipe
21, plug head
10, slot portion
51, first sealing position
52, second sealing position
53 third sealing position
210, inner peripheral surface
212, outer peripheral surface
100, outer peripheral surface
101, inner peripheral surface
211, compression portion
22, protruding portion
11, cylindrical portion
12, outer cylindrical portion
13, inner cylindrical portion

DETAILED DESCRIPTION

The present disclosure is described in detail in conjunction with the embodiment/various embodiments shown in the accompanying drawings, but it should be noted that the embodiment/these embodiments is/are not a limitation of the present invention. Functional, methodological, or structural equivalent transformations or substitutions made by a person of ordinary skill in the art in accordance with the embodiment/these embodiments are within the scope of protection of the present invention.

Figure 2:
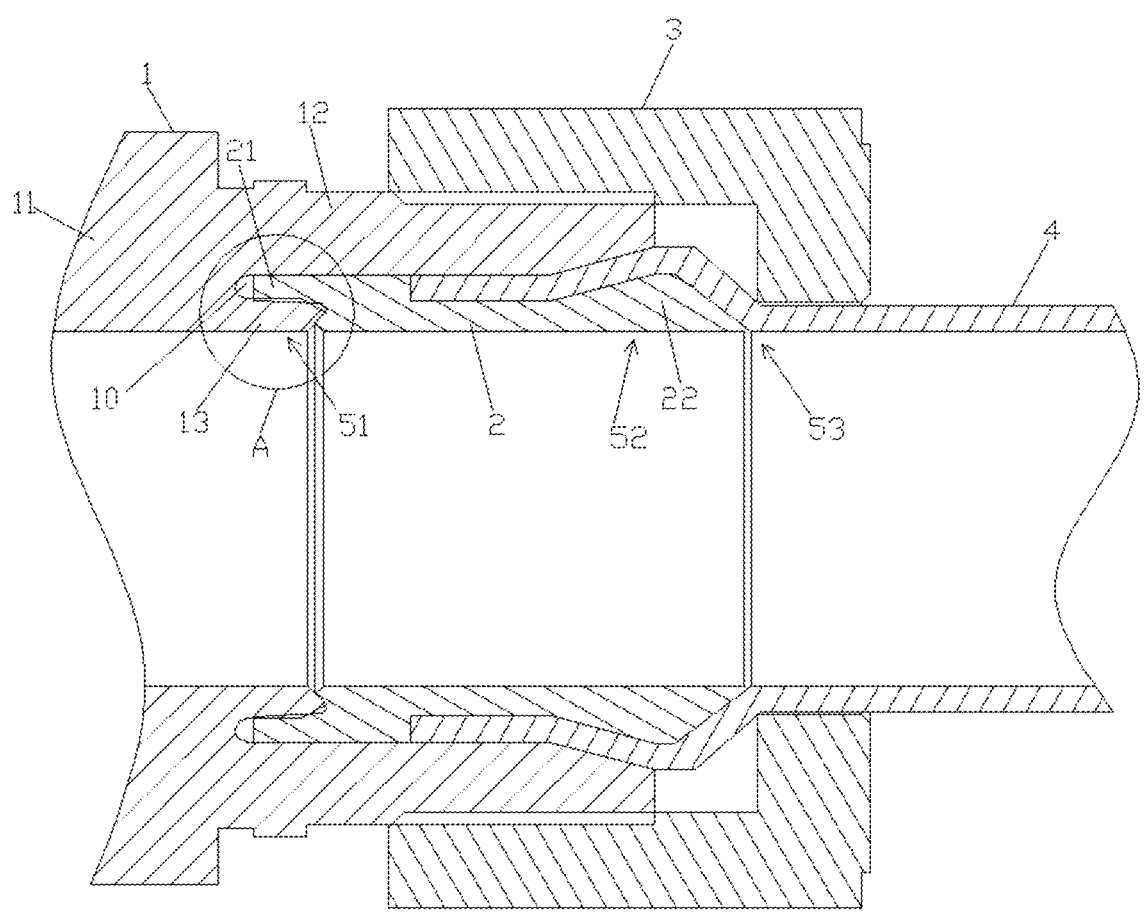
FIG. 2 is a structural schematic view of a sealing pipe joint made of resin in accordance with an embodiment of the present disclosure.
Figure 3:
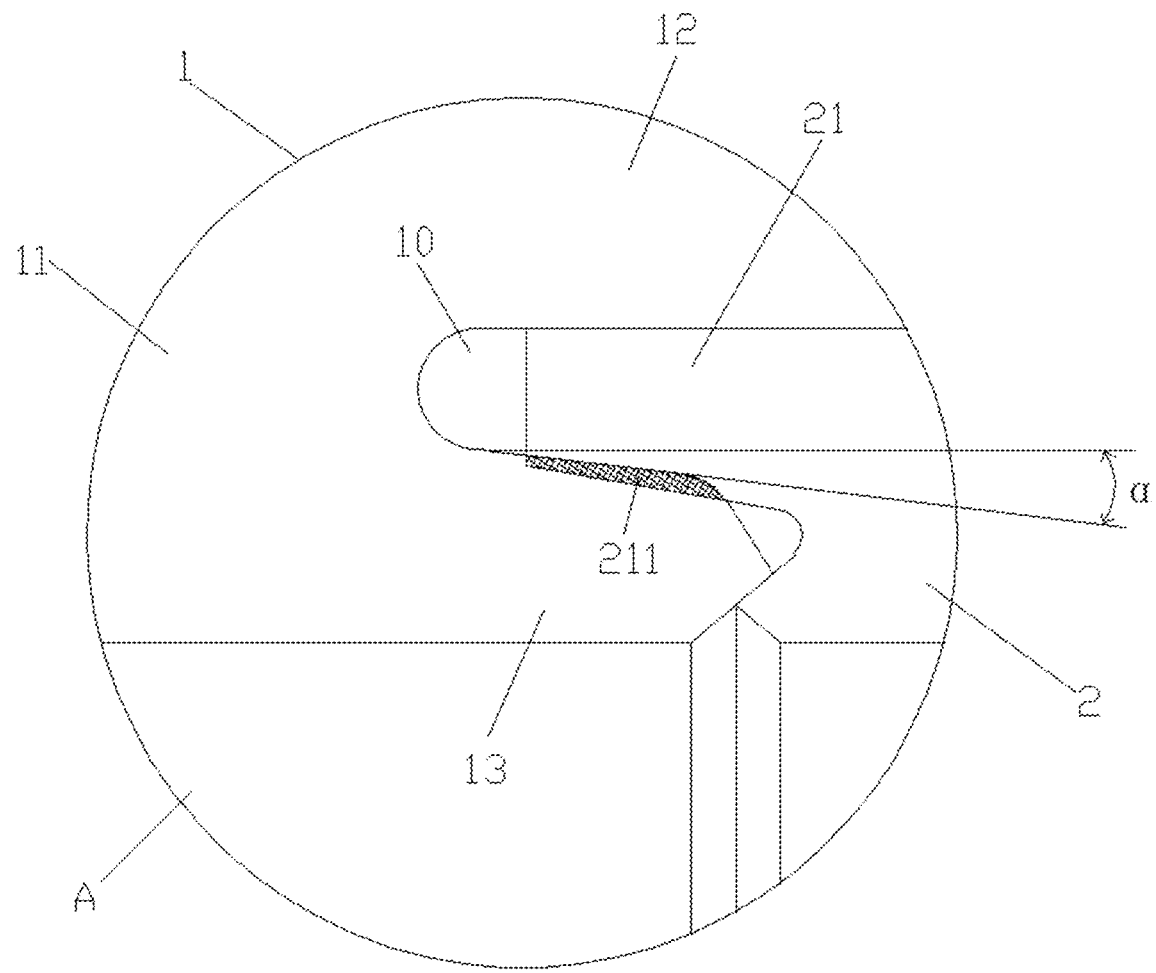
FIG. 3 is an enlarged view of a part A in FIG. 2.
Figure 4:
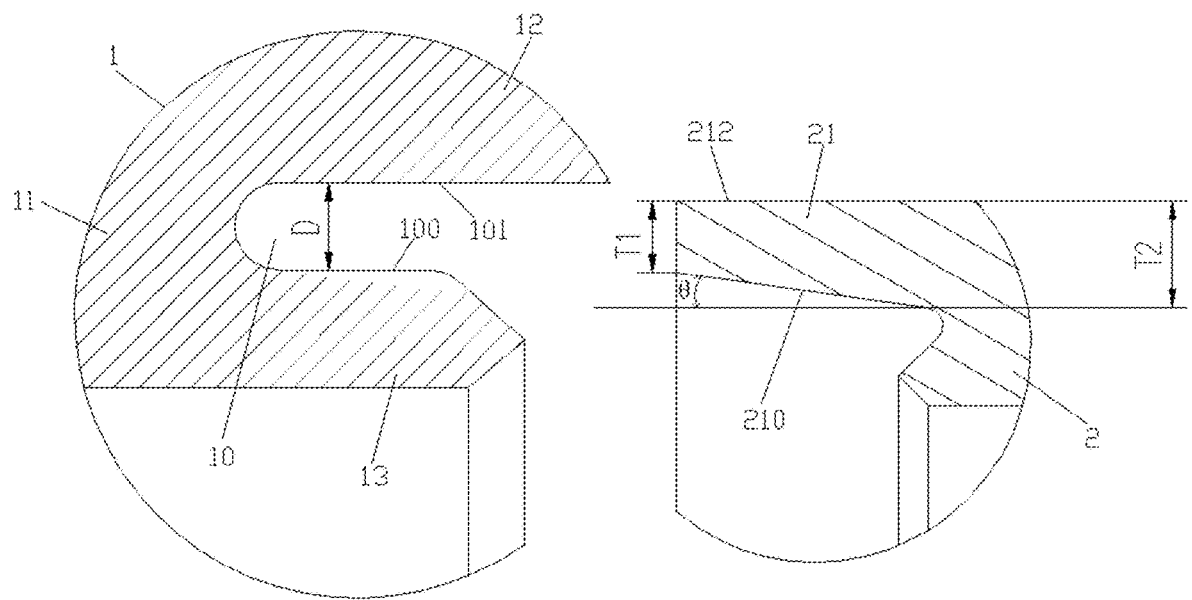
FIG. 4 is structural schematic view of the plug head and the slot portion shown in FIG. 3 before the plug head is inserted into the slot portion.

As shown in FIGS. 2 to 4, a sealing pipe joint made of resin includes a joint body 1, an inner ring 2, and a nut 3. The joint body 1 and the inner ring 2 are respectively made of a resin material. The joint body 1 and the inner ring 2 are deformable.

The inner ring 2 includes a plug head 21, the joint body 1 includes a slot portion 10. The plug head 21 is inserted within the slot portion 10 to form a sealing connection, namely a first sealing position 51.

In a free state, a radius thickness of the plug head 21 is linearly changed along an axis of the inner ring 2; and in a plugged state, the slot portion 10 is elastically deformed and a radius changing rate of the slot portion 10 is less than a radius changing rate of the plug head 21 when the plug head 21 is in the free state. In this embodiment, in the free state, i.e., when the plug head 21 is not inserted into the slot portion 10, an inner peripheral surface 210 of the plug head 21 and the axis of the inner ring 2 form an angle θ, and 0<θ≤15°. In the present embodiment, θ=15°. The plug head 21 is provided with an inclination angle θ, which facilitates positioning the plug head 21 into the slot portion 10 and forms a surface seal when the plug head 21 is inserted into the slot portion 10.

As the plug head 21 is provided with the inclination angle θ, a frictional resistance to be overcome during the insertion of the plug head 21 into the slot portion 10 is reduced. The frictional resistance is gradually increased, so that a contact surface is less likely to be damaged, and the sealing effect between the joint body 1 and the inner ring 2 is more durable. Thus, the service life of the joint body 1 and the inner ring 2 can be extended; furthermore, the nut 3 can be tightened by applying only a small torque, saving time and labor.

In the plugged state, the plug head 21 is compressed, as the compressed portion 211 shown in the in FIG. 2. With deeper insertion into the slot portion 10, the compression of the plug head 21 increases. At the same time, the slot portion 10 is deformed, and an outer peripheral surface 100 of the slot portion 10 and the axis of the inner ring 2 form an angle α. The angle θ is greater than the angle α, which ensures the sealing effect of the plug head 21 and the slot portion 10.

T2>T1>D, wherein D is a width of the slot portion 10, T1 is a thickness of a front end of the plug head 21, and T2 is a thickness of a rear end of the plug head 21. In the plugged state, the compression rate of the plug head 21 decreases along the insertion direction. A compression rate of the front end of the plug head 21 is greater than or equal to 0, and a compression rate of the rear end of the plug head 21 is less than or equal to 40%.

In the free state, an outer peripheral surface 212 of the plug head 21 and the axis of the inner ring 2 form an angle that is greater than or equal to 0. In the plugged state, the outer peripheral surface 212 of the plug head 21 is attached to an inner peripheral surface 101 of the slot portion 10, the outer peripheral surface 212 of the plug head 21 is squeezed, the slot portion 10 is elastically deformed, and the inner peripheral surface 101 of the slot portion 10 and the axis of the inner ring 2 form an angle.

The front end of the plug head 21 has the largest stroke and the smallest compression, while the rear end of the plug head 21 has the largest compression and the smallest stroke. During the disassembly, the rear end of the plug head 21 which has the largest compression is first detached from the slot portion 10, thus, the inner ring 2 can be disengaged from the joint body 1 with a relatively small force while maintaining a connection state between the inner ring 2 and the pipe 4. In this case, the damage to the inner ring 2 during each installation and disassembly is reduced, which therefore improves the service life of the inner ring 2 for multiple installations and disassemblies. Meanwhile, it is relatively labor-saving for each installation and disassembly, allowing the re-connection between the pipe 4 and the pipe joint to be more labor-saving, reliable, and easy. Furthermore, since the wear of the inner ring 2 and the joint body 1 can be avoided and the compression rate of the inner ring 2 is not reduced, the sealing reliability and durability can be ensured after the pipe joint is re-connected to the pipe 4.

During the disassembly, the inner ring 2 and the pipe 4 are not disengaged and the pipe 4 is not deformed, thereby ensuring the sealing effect of a second sealing position 52 and a third sealing position 53 when the inner ring 2 and the pipe 4 are re-connected together. Thus, a good sealing between the joint body 1 and the inner ring 2 can be ensured, no matter when the pipe joint is connected to the pipe 4 at the first time or is re-connected to the pipe 4.

The joint body 1 includes a cylindrical portion 11. The cylindrical portion 11 includes an outer cylindrical portion 12 and an inner cylindrical portion 13 formed on one side of the cylindrical portion 11. The outer cylindrical portion 12 and the inner cylindrical portion 13 extends outwardly from the cylindrical portion 11 in an axial direction of the cylindrical portion 11, and are respectively arranged at the radially outer and inner sides of the cylindrical portion 11. The outer cylindrical portion 12 has an extension length greater than that of the inner cylindrical portion 13, and the slot portion 10 is surrounded by the cylindrical portion 11, the outer cylindrical portion 12 and the inner cylindrical portion 13.

The sealing pipe joint further includes the pipe 4. The inner ring 2 is inserted into the pipe 4. The inner ring 2 is provided with a protrusion 22 protruding radially outward, and the protrusion 22 enlarges an inlet portion of the pipe 4 to form a sealing connection, namely the second sealing position 52. The pipe 4 extends between the joint body 1 and the inner ring 2. The nut 3 and the protrusion 22 of the inner ring 2 clamp the pipe 4 tightly to form a sealing connection, namely the third sealing position 53.

The nut 3 is mounted on the pipe 4 and screwed to the joint body 1. In an embodiment, the nut 3 is fastened to the outer cylindrical portion 12 of the joint body 1 through internal threads, and the nut 3 cooperates with the inner ring 2 to fasten the pipe 4 in the joint body 1. The nut 3 is connected to the join body 1 to maintain the plugged state between the plug head 21 and the slot portion 10, and the nut 3 remains pressing against the inner ring 2.

Since the frictional resistance to be overcome by the inner ring 2 during the insertion of the plug head 21 into the slot portion 10 is small, the nut 3 is capable of forming a sealing portion which applies an appropriate pressure between the interconnected joint body 1 and the inner ring 2 by applying a relatively less torque. The nut 3 can further applies a sealing force radially through the sealing portion so that the plug head 21 and the slot portion 10 are tightly attached to each other, thereby ensuring a desired sealing between the joint body 1 and the inner ring 2 and the sealing effect of the first sealing position 51.

The above listed series of detailed description is only for the feasible implementation of the present disclosure, they are not used to limit the scope of protection of the present disclosure, where those within the spirit of the art of the present disclosure or the equivalent implementation of the spirit of the change should be included in the scope of protection of the present disclosure.

In addition, it should be understood that, although the specification is described in accordance with the embodiments, but not each embodiment contains only one independent technical program, the specification of this narrative is only for the sake of clarity, the person skilled in the art should take the specification as a whole, the technical programs in the embodiments can be combined appropriately to form other embodiments that can be understood by the person skilled in the art.

What is claimed is:

1. A sealing pipe joint made of resin, wherein:
   the sealing pipe joint made of resin comprises a joint body, an inner ring, and a nut; the inner ring comprises a plug head, the joint body comprises a slot portion, the plug head is inserted within the slot portion to form a sealing connection; the nut is connected to the join body to maintain a plugged state between the plug head and the slot portion, the nut remains pressing against the inner ring;

in a free state, a radius thickness of the plug head is linearly changed along an axis of the inner ring, and in the plugged state, the slot portion is elastically deformed and a radius changing rate of the slot portion is less than a radius changing rate of the plug head when the plug head is in the free state; in the free state, an inner peripheral surface of the plug head and an axis of the inner ring form an angle $\theta$; in the plugged state, the slot portion is deformed, and an outer peripheral surface of the slot portion and the axis of the inner ring form an angle $\alpha$, the angle $\theta$ is greater than the angle $\alpha$, and $0<\theta<15°$; $T2>T1>D$, D is a width of the slot portion, T1 is a thickness of a front end of the plug head, and T2 is a thickness of a rear end of the plug head.

2. The sealing pipe joint made of resin according to claim 1, wherein in the plugged state, a compression rate of the plug head decreases along an insertion direction, a compression rate of the front end of the plug head is greater than or equal to 0, and a compression rate of the rear end of the plug head is less than or equal to 40%.

3. The sealing pipe joint made of resin according to claim 2, wherein in the free state, an outer peripheral surface of the plug head and the axis of the inner ring form an angle.

4. The sealing pipe joint made of resin according to claim 1, wherein the joint body comprises a cylindrical portion), the cylindrical portion comprises an outer cylindrical portion and an inner cylindrical portion formed on one side thereof, extending outwardly in an axial direction of the cylindrical portion, the outer cylindrical portion has an extension length greater than that of the inner cylindrical portion, the slot portion is surrounded by the cylindrical portion, the outer cylindrical portion and the inner cylindrical portion.

5. The sealing pipe joint made of resin according to claim 1 further comprising a pipe, wherein the inner ring is inserted into the pipe, the inner ring is provided with a protrusion protruding radially outward, and the protrusion enlarges an inlet portion of the pipe to form a sealing connection.

6. The sealing pipe joint made of resin according to claim 5, wherein the pipe extends between the joint body and the inner ring, the nut is mounted on the pipe and screwed to the joint body, the nut and protrusion of the inner ring clamp the pipe tightly so as to form a sealing connection.

7. The sealing pipe joint made of resin according to claim 1, wherein the joint body and the inner ring are made of a resin material.

* * * * *